United States Patent Office 2,895,613
Patented July 21, 1959

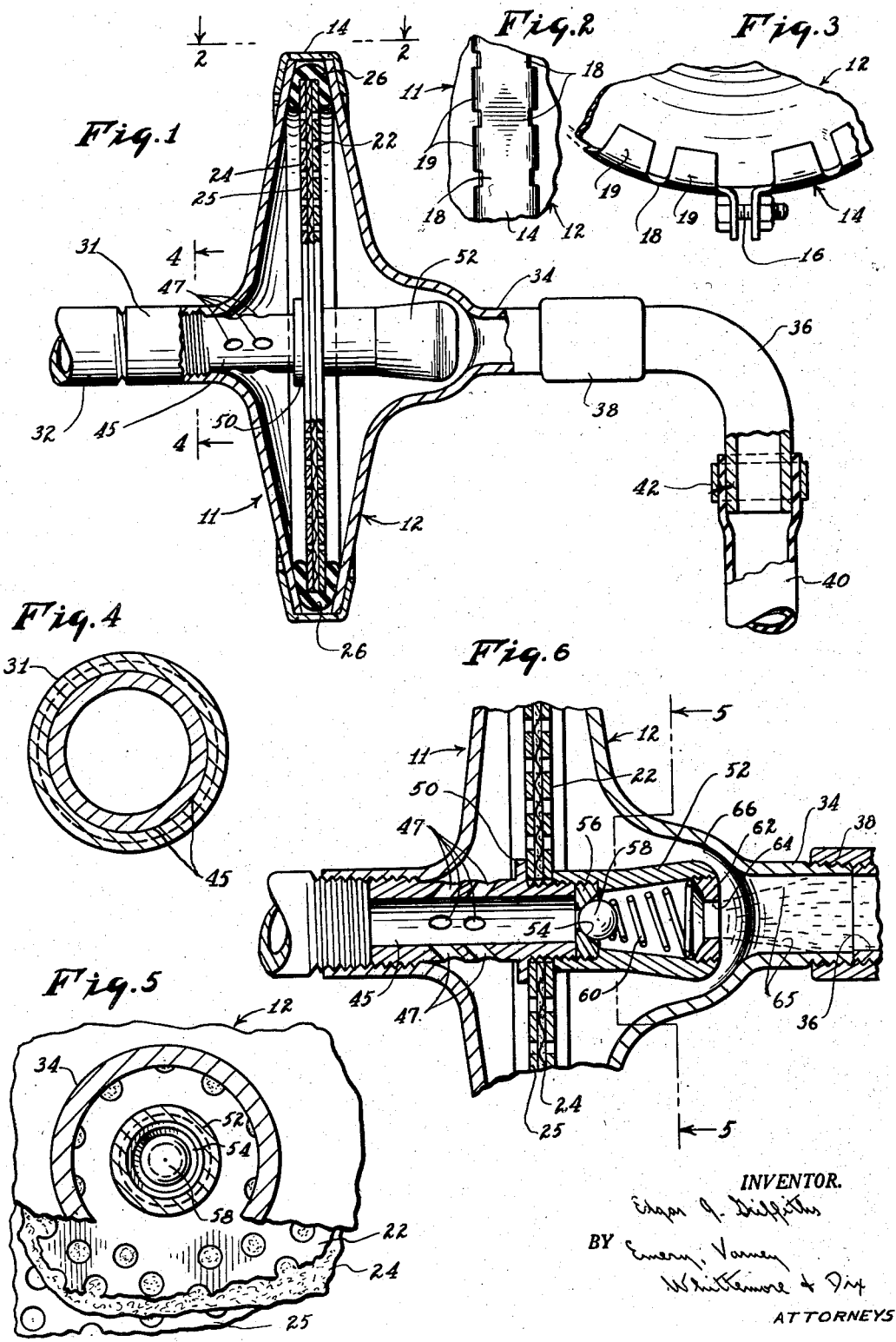

2,895,613

FILTER FOR SAMPLING FLUIDS

Edgar J. Griffiths, Pittsburgh, Pa.

Application March 17, 1955, Serial No. 494,989

10 Claims. (Cl. 210—130)

This invention relates to filters for fluid, and more especially to filters of the class in which a sheet of cloth or similar material is used as the filter element.

It is an object of the invention to provide a filter in which a sampling of the fluid is filtered. The filtered sampling is preferably mixed again with the unfiltered fluid, but the deposit on the filter element provides a measure of the foreign and extraneous material in the fluid.

While the invention can be used for filtering various fluids, and can be employed for a number of different purposes, it will be described in connection with the filtering of milk for farm pickup trucks.

A modern method for the transfer of milk from farms to bottling or processing plants includes the storage of milk in refrigerated tanks on the farm and the periodical pick-up of the milk by large tank trucks. It is desirable to make the transfer from the farm tank to the truck as quickly as possible so as to avoid loss of time to the pickup truck and the operator of the truck. It is, therefore, not possible to pass the milk through a filter of small size; and filters large enough to avoid delay in the transfer to the truck would be of excessive size and cost.

This invention provides a filter in which a sampling of the milk is passed through a filter medium during the transfer from the farm tank to the truck; and the amount of material left deposited on the filter medium provides an accurate measure of the condition of all of the milk delivered to the truck. The filter medium is removed from the filter, placed in a clean container, and taken to the milk laboratory for test.

One feature of the invention relates to the continuous sampling of the milk during the full period of delivery from the farm tank to the truck so that the deposit on the filter medium represents the condition of the entire quantity of the milk delivered to the truck.

Another object of the invention is to provide a filter of the character indicated which is simple, inexpensive in construction, and convenient to use.

Other objects, features and advantages of the invention will appear or be pointed out as the description proceeds.

In the drawing, forming a part hereof, in which like reference characters indicate corresponding parts in all the views;

Figure 1 is a sectional view through a sampling filter embodying this invention;

Figure 2 is a fragmentary view showing an elevation of the filter clamp when looking at the filter in a radial direction;

Figure 3 is a fragmentary, detail view of a portion of the clamp when viewing it in an axial direction;

Figures 4 and 5 are enlarged sectional views taken on the lines 4—4 and 5—5, respectively, of Figure 1; and Figure 6 is an enlarged sectional view through a portion of the apparatus shown in Figure 1.

The filter shown in Figure 1 includes a casing having two sections 11 and 12 which will be referred to as the inlet and outlet sections, respectively. These sections 11 and 12 are held together by a clamp 14 which extends around the entire periphery of the filter casing. The outside surfaces of the casing sections 11 and 12 converge toward their circumferential edges, and the clamp 14 is tapered to fit the converging surfaces of the sections 11 and 12.

The ends of the clamp 14 turn outward, as shown in Figure 3, and they are drawn together by a clamping bolt 16 to reduce the circumferential extent of the clamp 14. This causes the clamp to move radially inward and to force the casing sections 11 and 12 together in an axial direction.

The tapered sides of the clamp 14 are discontinuous, but they are joined by connecting sections 18 which form a split cylindrical ring around the periphery of the casing. The discontinuous sides are indicated by the reference characters 19, and the construction provides a simple and flexible clamp which can be made in one piece and which has great strength without impairing its flexibility.

Referring again to Figure 1, a perforated supporting plate 22 is located within the chamber enclosed by the casing sections 11 and 12. A filter element consisting of a layer of filter cloth 24, is located on the left-hand or upstream side of the perforated supporting plate 22. Another perforated plate 25 is preferably used to hold the filter element against the plate 22. The supporting plates 22 and 25 and the filter cloth 24 are preferably coextensive and they have their peripheral edge portions enclosed within a gasket 26. There is a straight cylindrical face of the gasket 26 around the circumferential edges of the plates 22 and 25.

The gasket 26 is clamped between the peripheral portions of the casing sections 11 and 12 and it serves the dual purpose of holding the filter cloth and supporting plates together and sealing the casing against leakage from between the confronting faces of the casing sections 11 and 12.

The casing section 11 has a hub portion 31 through which liquid flows into the filter. A supply pipe 32 is shown threaded into the inlet opening through the hub portion 31. The outlet section 12 has a hub 34 with an opening through which liquid flows from the casing, and this hub 34 is connected with a delivery pipe 36 by a coupling 38. A flexible hose 40 is shown connected to the delivery pipe 36 by a hose clamp 42. If desired, the hose can be clamped directly to the outlet hub 34.

A conduit 45 is threaded into the inlet hub portion 31. This conduit extends through center openings in the filter element 24 and the plates 22 and 25. There are passages 47 opening through the wall of the conduit 45 at locations on the upstream side of the filter element 24. These passages 47 extend at acute angles to the longitudinal axis of the conduit 45 so that they extend in directions having substantial radial components for distributing the milk throughout the area of the filter element 24.

A shoulder 50 in the outside of the conduit 45 abuts against the surface of the supporting plate 25. Beyond the shoulder 50, the conduit 45 is threaded and a housing 52 screws over the threads until the end face of the housing 52 comes against the supporting plate 22. Thus the plates 22 and 25, with the filter element 24 between them, are clamped together at their mid regions by the shoulder 50 and the end face of the housing 52.

Within the housing 52 there is a valve seat 54. This valve seat is on the downstream side of a ring 56 screwed in the housing 52. A valve element 58, preferably a ball, is urged against the valve seat 54 by a spring 60 in a direction against the flow of the fluid through the conduit 45. The housing 52 is a continuation of the conduit 45 for the flow of fluid through the casing without passing through the filter element 24. The valve element 58 moves into open position when the upstream pressure becomes great enough to overcome the initial force of the spring 60. Progressively greater force is required to compress the spring 60 as the valve element moves further from its seat.

A bushing 62 is screwed, or otherwise secured in place, at the downstream end of the housing 52. This bushing 62 has a center orifice 64 from which the milk discharges in a diverging stream, indicated by the dotted lines 65, into the outlet passage through the hub portion of the casing. There is an annular passage 66 between the housing 52 and the wall of the casing section 12 communicating with the interior of the casing on the downstream side of the filter element 24.

The stream of fluid from the orifice 64 produces a suction at the annular passage 66 to reduce the pressure within the casing on the downstream side of the filter element 24. The discharge end of the housing 52 and the associated parts of the casing section 12 comprise, therefore, an aspirator operated by the flow through the housing 52 for reducing pressure on the downstream side of the filter element 24. Thus an increase in the rate of flow through the conduit 45 and its extension, provided by the housing 52, causes a greater pressure drop across the filter element 24 to increase the flow through the filter element.

The pressure required for an equal flow of fluid through the filter element 24 increases during the use of the filter because of the clogging up of some of the interstices of the filter element 24. The effect is compensated for by the suction on the downstream side of the filter element which results from the aspirator operation. An increase in the resistance of the filter causes more of the fluid to flow through the conduit 45, and this increases the suction produced by the aspirator and results in a suction on the downstream side of the filter element to increase the flow of fluid through the filter element, as previously explained. The proportion of the milk which flows through the filter element as compared with that which flows through the conduit 45 depends upon a number of different factors including the fineness of the filter element 24, and the extent to which the interstices fill up. This latter depends, in turn, both upon the condition of the milk and the amount of milk passed through the filter element. Other factors influencing the percentage of milk that is filtered include the pressure drop through the conduit 45.

In order to control the pressure drop through the conduit 45, different obstructions can be used with the conduit. For example, different bushings 62 can be placed in the end of the housing 52 with different sizes of orifices in place of the orifice 64. When a valve is used to produce additional resistance of flow through the conduit 45, springs of different strength can be used behind the valve element 58 in place of the spring 60. In practice, it is more convenient to have different valve assemblies which include the housing 52, ring 56, valve element 58 and bushing 62. One such assembly can be removed and another put into the sampling filter when the operation is to be under different circumstances.

The pressure of the spring 60 against the valve element 58 prevents any fluid from flowing through the conduit 45, without passing through the filter element 24 until the pressure on the upstream side of the filter element reaches a predetermined value. The valve element 58 then moves into an open position; but the progressively greater pressure of the spring 60, as the valve element 58 moves into wider opening positions, increases the pressure required to cause greater flow of fluid through the housing 52. In the preferred construction, the space within the housing 52, along which the valve element 58 moves, increases in cross section toward the discharge end of the housing 52. This taper of the valve space is exaggerated in the drawing for clearer illustration.

The percentage of fluid which passes through the filter element 24, under any given conditions of operation, is initially determined by computations based upon pressure and flow measurements taken at different regions of the filter under controlled conditions. When the filter is to be used in practice, the proper ring 56, spring 60, orifice 64 and mesh of filter element 24 are selected from a calibration table.

The preferred embodiment of the invention has been illustrated and described but changes and modifications can be made and some features of the invention can be used in different combinations without departing from the invention as defined in the claims.

What is claimed is:

1. A sampling filter for a fluid including a casing enclosing a chamber, a filter element within the chamber and having passages therethrough, a support for the filter element, passages opening into the casing at opposite sides of the filter element for the entrance and discharge of fluid, and a conduit leading from the chamber on the upstream side of the filter and by-passing the filter element, the by-pass conduit and the passages through the filter element being open simultaneously for the flow of liquid, the discharge passage being in simultaneous communication with the by-pass conduit and the chamber on the downstream side of the filter element during the flow of liquid through the by-pass conduit whereby the flow of filtered liquid and by-passed liquid merge in the discharge passage, said conduit having its downstream end directed into the discharge passage, and means for determining the proportions of the liquid flow that pass through the filter and the by-pass.

2. The fluid-sampling filter described in claim 1 and in which the conduit passes through the filter element and the support for the filter element.

3. The fluid-sampling filter described in claim 1 and in which there is an aspirator located on the downstream side of the filter element and operated by the fluid passing through the conduit for producing a suction in the chamber on the downstream side of said filter element.

4. The sampling filter described in claim 1 and in which the casing is made up of two sections having confronting faces which converge toward their peripheral edge portions and in which there are means for clamping the peripheral edge portions of the casing together and the filter element is clamped between said peripheral edge portions to hold it in position.

5. The filter described in claim 1 and in which the casing comprises two sections having confronting faces which converge toward their peripheral edge portions, and there are means for clamping the peripheral edge portions together, said means including a band extending around the casing and having converging faces which contact with the outside surfaces of the peripheral edge portions of said sections, and a screw for reducing the circumference of the clamping band to move its converging faces radially inward to clamp the sections of the casing together with greater force, the filter element having an edge portion which is clamped between the confronting faces of the casing sections to secure the filter in place.

6. The filter described in claim 1 and in which the casing is made up of two sections having confronting faces with peripheral edge portions that are clamped together to close the casing, and in which the support for the filter element is a perforated plate and the perforated plate and filter element both have edge portions, a gasket of U-shaped cross-section covering the edge portions of the plate and filter element and extending radially inwardly over annular areas of the filter element and plate, said gasket and the filter element and plate being clamped together between the confronting faces of the casing sections, and means for holding the sections together under pressure including a band extending around the circumference of the casing and having converging faces contacting with the outside surfaces of the peripheral portions of the casing sections, and a screw for pulling the ends of the band together to reduce its circumference and draw the converging faces radially inward to force the sections of the chamber together under greater clamping pressure.

7. A filter for indicating the condition of a representative portion of a mass of liquid being transferred from one container to another, said filter comprising a casing enclosing a chamber, a support within the chamber for holding a filter element, the support having an opening therethrough for the passage of liquid through the filter element, an inlet passage through which liquid enters the chamber, an outlet passage through which liquid is discharged from the chamber, the inlet and outlet passages being on opposite sides of the filter support, and a by-pass conduit of substantially smaller cross-section than the filter element in position to transmit liquid from one side of the filter element support to the other without passing through the filter, the by-pass conduit and the opening through the support being open simultaneously for the flow of liquid, the outlet passage being in simultaneous communication with the by-pass conduit and the chamber on the downstream side of the filter element during the flow of liquid through the by-pass conduit whereby filtered liquid and by-passed liquid merge in the outlet passage, said conduit having its downstream end directed into the discharge passage and in substantially the same direction as the flow of filtered liquid from the chamber, the by-pass being of a pre-determined size with respect to the area of the filter for transmitting a definite percentage of the total liquid through the casing.

8. A filter comprising a casing including two sections with edge portions that are clamped together when the casing is assembled, a filter element having edge portions clamped between the two sections of the casing to hold the filter element at a substantially fixed location in the casing, inlet and outlet passages for the casing on opposite sides of the filter element, a conduit of substantially smaller cross section than the filter element and through which liquid passes from the inlet to the outlet passage without going through the filter element, the outlet passage being in simultaneous communication with the by-pass conduit and the chamber on the downstream side of the filter element during the flow of liquid through the by-pass conduit whereby filtered liquid and by-passed liquid merge in the outlet passage, said conduit having its downstream end directed into the outlet passage and in substantially the same direction as the flow of filtered liquid through the outlet passage, a valve in said conduit in position to close against the flow and a spring urging the valve toward closed position for regulating the rate of flow through the conduit at different pressure heads, the spring having a force less than the pressure drop across the filter element within the intended operating range of the filter.

9. A liquid filter comprising a casing enclosing a chamber, an inlet passage on one side of the chamber, filter means within the chamber, a free-flow conduit extending through the filter means and having an inlet end located at the inlet passage of the casing and having discharge openings through the side of the conduit at a location within the chamber and on the upstream side of the filter element for the escape of liquid from the conduit into the chamber, and means for restricting the flow of liquid from said conduit and an aspirator operated by liquid that passes through the free-flow conduit, the aspirator communicating with the chamber on the downstream side of the filter element and being in position to exert suction on the downstream side of the filter element.

10. A sampling filter system for a fluid including a casing enclosing a chamber, a filter element within the chamber and having passages therethrough, a support for the filter element, passages opening into the casing at opposite sides of the filter element for the entrance and discharge of fluid, and a conduit leading from the chamber on the upstream side of the filter and by-passing the filter element, the by-pass conduit and the passages through the filter element being open simultaneously for the flow of liquid, the discharge passage being in simultaneous communication with the by-pass conduit and the chamber on the downstream side of the filter element during the flow of liquid through the by-pass conduit, and the system including an aspirator through which at least a portion of the by-passed liquid passes, the aspirator having its suction side in communication with the chamber on the downstream side of the filter and having its discharge side communicating with the discharge passage.

References Cited in the file of this patent

UNITED STATES PATENTS

| | | |
|---|---|---|
| 1,496,947 | Robinson | June 10, 1924 |
| 1,720,475 | Hewitt | July 9, 1929 |
| 2,280,480 | Cox | Apr. 21, 1942 |
| 2,547,797 | Torrey et al. | Apr. 3, 1951 |
| 2,709,524 | Russell et al. | May 31, 1955 |
| 2,727,634 | O'Meara | Dec. 20, 1955 |

FOREIGN PATENTS

| | | |
|---|---|---|
| 1,051,660 | France | Sept. 16, 1953 |